US008843298B2

(12) United States Patent
Nakatsuji et al.

(10) Patent No.: US 8,843,298 B2
(45) Date of Patent: Sep. 23, 2014

(54) ENGINE CONTROL SYSTEM FOR ACTUATOR CONTROL

(75) Inventors: Yuuki Nakatsuji, Kariya (JP); Sumitaka Ikeda, Anjo (JP); Kazuhiro Higuchi, Ichinomiya (JP); Koji Ishizuka, Aichi-ken (JP)

(73) Assignee: Denso Corporation, Kariya (JP)

( * ) Notice: Subject to any disclaimer, the term of this patent is extended or adjusted under 35 U.S.C. 154(b) by 302 days.

(21) Appl. No.: 13/420,981

(22) Filed: Mar. 15, 2012

(65) Prior Publication Data

US 2012/0239273 A1 Sep. 20, 2012

(30) Foreign Application Priority Data

Mar. 15, 2011 (JP) ................................ 2011-056137

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F02D 41/14*** | (2006.01) |
| ***F02D 37/02*** | (2006.01) |
| ***F02D 35/02*** | (2006.01) |

(52) U.S. Cl.

CPC ............ *F02D 37/02* (2013.01); *F02D 41/1497* (2013.01); *F02D 41/146* (2013.01); *F02D 41/1401* (2013.01); *F02D 35/028* (2013.01); *F02D 2200/1002* (2013.01); *F02D 2041/141* (2013.01); *F02D 41/1466* (2013.01); *F02D 35/023* (2013.01); *F02D 2200/025* (2013.01)

USPC ....... 701/106; 701/103; 701/104; 123/406.12

(58) Field of Classification Search

CPC . F02D 41/14; F02D 41/1404; F02D 41/1405; F02D 41/1479; F02D 2200/00

USPC ............... 701/103, 104, 106; 123/90.11, 472, 123/406.12, 399

See application file for complete search history.

(56) References Cited

U.S. PATENT DOCUMENTS

| | | | | |
|---|---|---|---|---|
| 8,370,065 | B2 * | 2/2013 | Takashima et al. | 701/480 |
| 8,401,762 | B2 * | 3/2013 | Asano et al. | 701/102 |
| 2008/0228383 | A1 * | 9/2008 | Nakagawa et al. | 701/113 |
| 2011/0106398 | A1 * | 5/2011 | Ikeda et al. | 701/102 |
| 2011/0106408 | A1 * | 5/2011 | Morimoto et al. | 701/103 |
| 2011/0288742 | A1 * | 11/2011 | Wermuth et al. | 701/102 |
| 2012/0103304 | A1 * | 5/2012 | Kang et al. | 123/305 |

FOREIGN PATENT DOCUMENTS

| | | |
|---|---|---|
| JP | 2002-155783 | 5/2002 |
| JP | 2006-170214 | 6/2006 |
| JP | 2009-156034 | 7/2009 |
| JP | 2010-203343 | 9/2010 |

OTHER PUBLICATIONS

Office Action (2 pgs.) dated Mar. 26, 2013 issued in corresponding Japanese Application No. 2011-056137 with an at least partial English-language translation (2 pgs.).

* cited by examiner

*Primary Examiner* — Thomas Moulis
*Assistant Examiner* — Joseph Dallo
(74) *Attorney, Agent, or Firm* — Nixon & Vanderhye PC

(57) ABSTRACT

An engine control system which may be used in automotive vehicles includes first correlation data representing correlations between performance parameters associated with different types of performances of a combustion engine and uncorrelated common factors existing among the performance parameters and second correlation data representing correlations between the common factors and combustion parameters associated with combustion states of fuel in the combustion engine. The engine control system determines target values of the common factors using the first correlation data and also determines target values of the combustion parameters using the second correlation data. The engine control system determines command values as a function of the target values of the combustion parameter and outputs them to actuators which control combustion states of fuel in the engine for achieving desired levels of the performances of the combustion engine. This enables the performance parameters to be controlled independently of each other without any interference.

4 Claims, 5 Drawing Sheets

FIG. 3

COMMON FACTOR (A3) = A2 X PERFORMANCE PARAMETER (A1)

$$\begin{pmatrix} f_1 \\ f_2 \\ f_3 \\ \vdots \\ f_1 \end{pmatrix} = \begin{pmatrix} a_{11} & a_{12} & \cdots & a_{1j} \\ a_{21} & a_{22} & & a_{2m} \\ \vdots & & \ddots & \vdots \\ a_{i1} & a_{n2} & \cdots & a_{ij} \end{pmatrix} \times \begin{pmatrix} NOx \\ CO \\ HC \\ \vdots \\ j \end{pmatrix}$$

A3 A2 A1

FIG. 4

COMBUSTION PARAMETER CHANGE (A6) = A5 X COMMON FACTOR CHANGE (A4)

$$\Delta \begin{pmatrix} \text{IGNITION TIMING} \\ \text{IGNITION LAG} \\ \text{HEAT RELEASE RATE} \\ \vdots\ k \end{pmatrix} = \begin{pmatrix} b_{11} & b_{12} & \cdots & b_{1r} \\ b_{21} & b_{22} & & b_{2r} \\ \vdots & & \ddots & \\ b_{q1} & b_{q2} & & b_{ki} \end{pmatrix} \times \Delta \begin{pmatrix} f_1 \\ f_2 \\ f_3 \\ \vdots\ i \end{pmatrix}$$

A6 A5 A4

FIG. 5

CONTROLLED PARAMETER CHANGE (A9) = A8 X COMBUSTION PARAMETER CHANGE (A7)

$$\Delta \begin{pmatrix} \text{INJECTION TIMING} \\ \text{INJECTION QUANTITY} \\ \text{INJECTION PRESSURE} \\ \vdots\ h \end{pmatrix} = \begin{pmatrix} c_{11} & c_{12} & \cdots & c_{1k} \\ c_{21} & c_{22} & & c_{2q} \\ \vdots & & \ddots & \\ c_{h1} & c_{p2} & & c_{hk} \end{pmatrix} \times \Delta \begin{pmatrix} \text{IGNITION TIMING} \\ \text{IGNITION LAG} \\ \text{HEAT RELEASE RATE} \\ \vdots\ k \end{pmatrix}$$

A9 A8 A7

ENGINE CONTROL SYSTEM FOR ACTUATOR CONTROL

CROSS REFERENCE TO RELATED DOCUMENT

The present application claims the benefit of priority of Japanese Patent Application No. 2011-56137 filed on Mar. 15, 2011, the disclosure of which is incorporated herein by reference.

BACKGROUND

1. Technical Field

This disclosure relates generally to an engine control system which may be employed in automotive vehicles and is designed to control operations of actuators to control different types of performances of the engine.

2. Background Art

Japanese Patent First Publication No. 2009-156034 discloses an engine control system which controls the quantity of fuel to be injected into an internal combustion engine, the injection timing, and the quantity of intake air sucked into the engine so as to meet required engine performance parameters such as the amount of exhaust emissions (e.g., NOx and CO), output torque of the engine, and the consumption of fuel in the engine.

The engine control system compares the level of combustion noise produced when the fuel has been sprayed actually at a specified reference fuel injection parameter in the condition where the concentration of oxygen in a cylinder of the engine is a certain value with that expected when the fuel is sprayed according to the reference fuel injection parameter in the condition where the concentration of oxygen in the cylinder meets a target value. When a difference between them is greater than a permissible range, the engine control system corrects the reference fuel injection parameter so that the difference falls in the permissible range and actuates a fuel injector according to the corrected reference fuel injection parameter to optimize the level of the combustion noise (i.e., one of performance parameters, as will be described later).

When there are a plurality of compatible values which meet a target level of the combustion noise, the engine control system also selects one of the compatible values which will result in a least amount of smoke (i.e. one of the performance parameters) emitted from the engine, thereby optimizing the amount of smoke as well as the combustion noise. The fuel injection parameter, as referred to above, may include the amount of fuel sprayed from a fuel injector in the pilot injection event or the main injection event in a multi-injection system, an injection-to-injection interval, and the timing of the main injection event.

There may, however, be correlations between the performance parameters. The decreasing of an interval (i.e., one of combustion parameters) between the pilot injection events to reduce the combustion noise (i.e., one of the performance parameters) may, therefore, result in an increase in amount of smoke (i.e., one of the performance parameters) emitted from the engine. Specifically, when the engine control system calculates target values of the performance parameters independently of each other and changes a plurality of controlled variables or parameters for actuators simultaneously for bringing them into agreement with the target values, it may result in interference between the different types of the performance parameters in that when one of the performance parameters reaches its target value, another performance parameter deviates from its target value.

SUMMARY

It is therefore an object to provide an engine control apparatus constructed to control a plurality of different types of performance parameters representing engine performances independently of each other.

According to one aspect of an embodiment, there is provided an engine control apparatus which may be employed in automotive vehicles. The engine control apparatus comprises: (a) a first storage which stores first correlation data representing correlations between a plurality of performance parameters associated with different types of performances of a combustion engine and mutually uncorrelated common factors existing among the performance parameters; (b) a second storage which stores second correlation data representing correlations between the common factors and a plurality of combustion parameters associated with combustion states of fuel in the combustion engine; (c) a target common factor determining circuit which determines target values of the common factors based on target values of the performance parameters using the first correlation data stored in the first storage; (d) a target combustion parameter determining circuit which determines target values of the combustion parameters using the second correlation data stored in the second storage based on the target values of the common factors, as derived by the target common factor determining circuit; and (e) a control command determining circuit which determines command values as a function of the target values of the combustion parameters, as determined by the target combustion parameter determining circuit. The command values are provided to actuators which work to control the combustion states of the fuel in the combustion engine for achieving desired levels of the performances of the combustion engine. The command values represent controlled parameters associated with operations of the actuators.

In the case where some of the performance parameters associated with the performances of the operations of the engine 10 have correlations therebetween, it may cause one of the performance parameters to reach its target value, but another performance parameter deviates from its target value. In other words, a mutual interference between the performance parameters may make it impossible to control the performance parameters separately.

The engine control apparatus has the first correlation data about the correlations between the different types of performance parameters and the common factors and uses the first correlation data to express the target values of the performance parameters by the plurality of mutually uncorrelated common factors existing among the performance parameters. The engine control apparatus also has the second correlation data about the correlations between the common factors and the different types of combustion parameters to determine the target values of the combustion parameters based on the target values of the common factors, as derived by converting the target values of the performance parameters, and calculates the command values (i.e., the target controlled parameters) used in driving the actuators based on the target values of the combustion parameters. The common factors, as described above, do not have any correlation therebetween. The use of such common factors, therefore, enables the performance parameters to be controlled independently of each other, thus resulting in improvement in controlling the operations of the engine.

In the preferred mode of the embodiment, the engine control apparatus also include a third storage which stores third correlation data which defines correlations between the combustion parameters and the controlled parameters. The control command determining circuit uses the third correlation data to determine the command values based on the target values of the combustion parameters, as determined by the target combustion parameter determining circuit.

The third correlation data, as described above, represents the correlations between the different types of combustion parameters and the different types of controlled parameters. In other words, the third correlation data does not define one-to-one correspondences between the combustion parameters and the controlled parameters, but defines the plurality of correlations between each of the combustion parameters and the controlled parameters, thereby eliminating mutual interferences among the combustion parameters contributing to the deterioration of control of the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(*b*) is a graph which represents common factors to be extracted from the performance parameters of FIG. 2(*a*);

FIG. 3 is an illustration which represents a determinant used as a common factor arithmetic expression used in the engine control system of FIG. 1;

FIG. 4 is an illustration which represents a combustion parameter arithmetic expression used in the engine control system of FIG. 1;

FIG. 5 is an illustration which represents a controlled parameter arithmetic expression used in the engine control system of FIG. 1;

DESCRIPTION OF THE PREFERRED EMBODIMENTS

Figure 1:
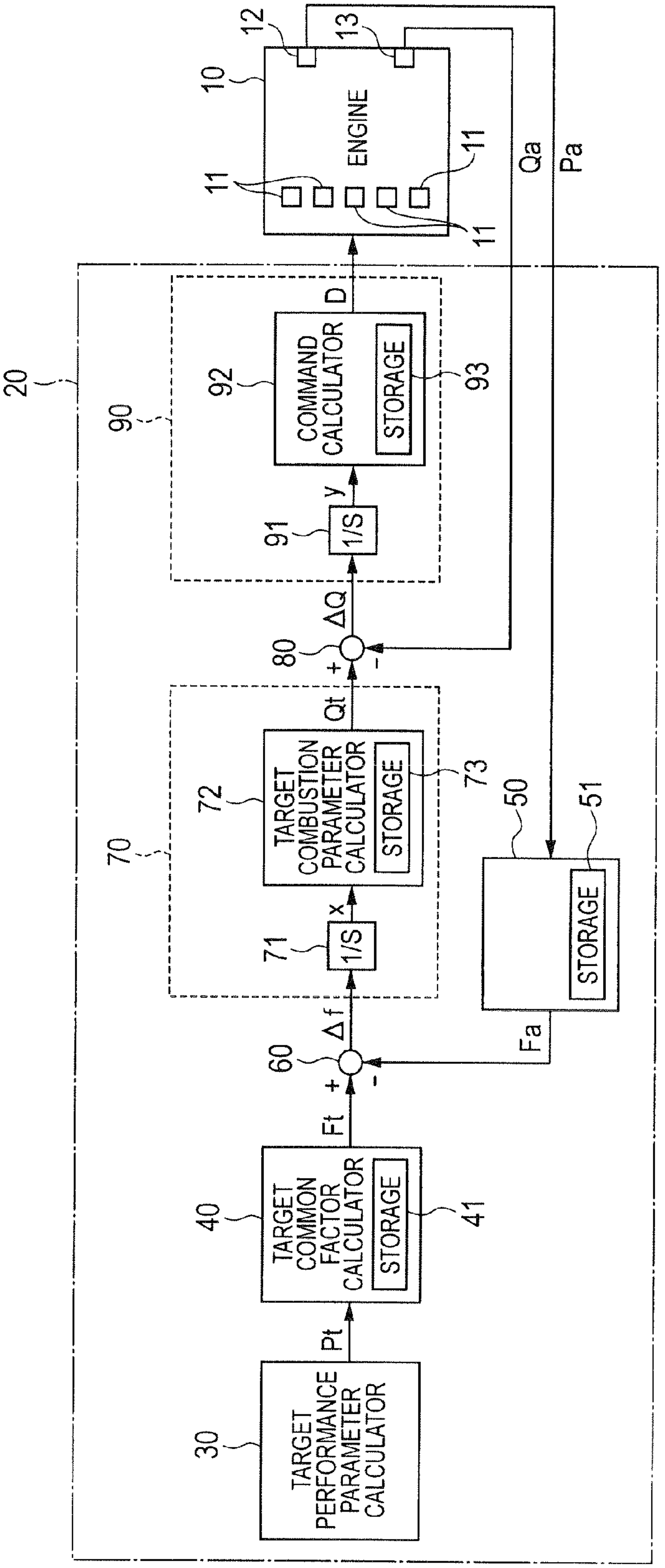
FIG. 1 is a block diagram which shows an engine control system according to the first embodiment.

Referring to the drawings, wherein like reference numbers refer to like parts in several views, particularly to FIG. 1, there is shown an engine control system according to the first embodiment which is designed to control an operation of an internal combustion engine 10 for automotive vehicles. The following discussion will refer to, as an example, a self-ignition diesel engine in which fuel is sprayed into cylinders at a high pressure.

The engine control system implemented by an electronic control unit (ECU) 20 which works to control operations of a plurality of actuators 11 installed in the engine 10 for yielding desired output characteristics or performance of the engine 10.

The actuators 11 used in a fuel system are, for example, fuel injectors which spray fuel into the engine 10 and a high-pressure pump which controls the pressure of fuel to be fed to the fuel injectors. The actuators 11 installed in an air intake system are, for example, an EGR (Exhaust Gas Recirculation) valve which controls the amount of a portion of exhaust gas emitted from the engine 10 to be returned back to an inlet port of the engine 10 (which will also be referred to as an EGR amount below), a variably-controlled supercharger which regulates the supercharging pressure variably, a throttle valve which controls the quantity of fresh air to be inducted into the cylinder of the engine 10, and a valve control mechanism which sets open and close timings of intake and exhaust valves of the engine 10 and regulates the amount of lift of the take and exhaust valves.

The engine 10 has installed therein performance sensors 12 and combustion state sensors 13 which provide outputs to the ECU 20. The performance sensors 12 work to measure a plurality of types of engine performances. For example, the performance sensors 12 are implemented by a NOx sensor which measures the amount of exhaust emissions (e.g., NOx, CO, and HC) emitted from the engine 10, an oxygen sensor which measures the concentration of oxygen in the exhaust emissions, a smoke sensor which measures the amount of smoke emitted from the engine 10, a torque sensor which measures torque outputted by the engine 10, and a combustion noise sensor which measures the level of combustion noise arising from combustion of fuel in the engine 10. The combustion state sensors 13 work to measure combustion states of the engine 10. For example, the combustion state sensors 13 are implemented by a cylinder pressure sensor which measures the pressure in the combustion chamber (i.e., the cylinder) of the engine 10, etc.

The engine control system is also equipped with a crank angle sensor which measures an angle (i.e., an angular position) of a crank shaft of the engine 10 and a coolant temperature sensor which measures the temperature of engine coolant.

The ECU 20 is equipped with a typical microcomputer including a CPU, a ROM, and a RAM and performs control programs, as stored in the ROM to control the engine 10 based on instantaneous engine operating conditions.

The ECU 20 monitors outputs from the above described sensors to determine the combustion states of the engine 10 needed to yield required performances of the engine 10 and calculates the controlled parameters for the actuators 11 to achieve the determined combustion states. Specifically, the ECU 20 controls the operations of the actuators 11 so as to meet target values of the performances of the engine 10 simultaneously in a coordinated way.

The combustion states of the engine 10, as referred to above, are defined by a plurality of types of combustion parameters. For example, the combustion parameters are the pressure in the cylinder of the engine 10, the heat release, the heat release rate, the ignition timing, the ignition lag (also called ignition delay) that is a time interval between start of spraying of the fuel from the fuel injector and the ignition of the sprayed fuel, and the ignition termination lag. The ignition timing, the ignition lag, and the ignition termination lag may be derived as a function of a change in pressure in the cylinder of the engine 10, as measured by the cylinder pressure sensor.

The performance of the engine 10 is expressed by a plurality of types of performance parameters that are values of, for example, the amount of exhaust emissions (e.g., NOx, CO, or HC) from the engine 10, the amount of smoke emitted from the engine 10, the torque outputted by the engine 10, the consumption of fuel in the engine 10 (e.g., a specific fuel consumption), and the level of combustion noise.

Some of the performance parameters, as described above, may have correlations therebetween. Therefore, when the ECU 20 calculates target values of the performance parameters independently of each other and then operates the actuators 11 simultaneously to meet the target values, it may result in mutual interference between the performance parameters. Specifically, when one of the performance parameters reaches its target value, another performance parameter deviates from its target value.

In order to alleviate the above problem, the ECU 20 is designed to extract uncorrelated common factors Fp from the performance parameters and use the common factors Fp as intermediate parameters to determine the controlled parameters.

Specifically, a common factor arithmetic expression (which will also be referred to as first correlation data) which defines correlations between the plurality of performance parameters and the common factors Fp and a combustion parameter arithmetic expression (which will also be referred to as second correlation data) which defines correlations between the plurality of common factors Fp and the combustion parameters are stored in the ROM of the ECU 20. The ECU 20 calculates target values of the common factors Fp corresponding to target values of the performance parameters using the common factor arithmetic expression and also calculates target values of the combustion parameters corresponding to the target values of the common factors Fp using the combustion parameter arithmetic expression. The ECU 20 determines command values based on the target values of the combustion parameters for use in controlling the operations (i.e., the controlled parameters) of the actuators 11.

Figures 2A, 2B:
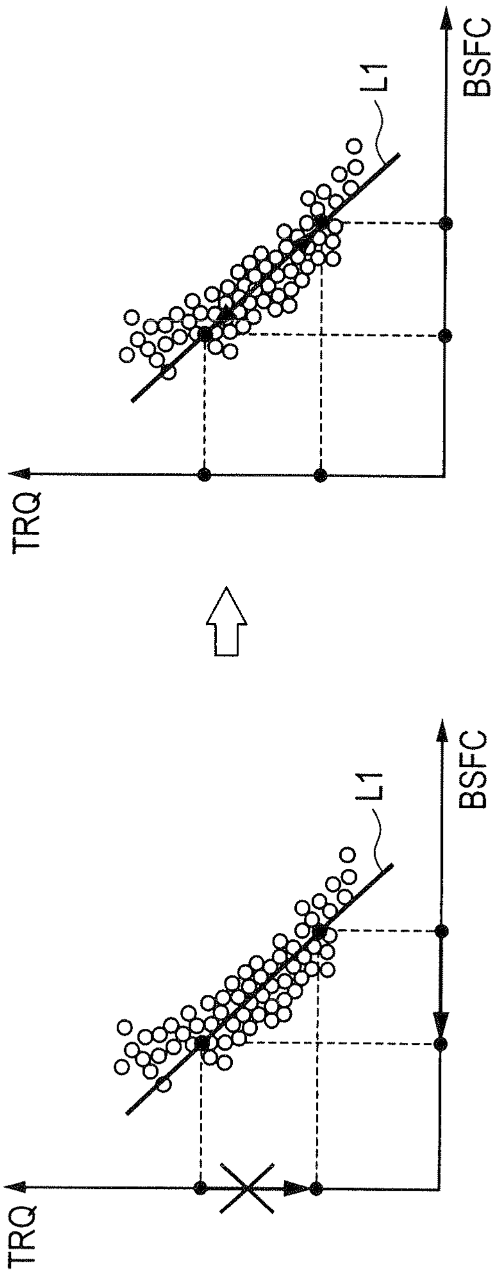
FIG. 2(*a*) is a graph which demonstrates a correlation between performance parameters.

The correlations between the performance parameters will also be described below with reference to FIGS. 2(*a*) and 2(*b*). In each of FIGS. 2(*a*) and 2(*b*), the horizontal axis indicates a brake specific fuel consumption (BSFC). The vertical axis indicates a measure of torque (TRQ) outputted from the engine 10. FIG. 2(*a*) represents the correlation between the performance parameters. FIG. 2(*b*) represents the common factors Fp to be extracted from the performance parameters.

The specific fuel consumption and the torque which are the performance parameters, as can be seen in FIG. 2(*a*), correlate with each other so that when the specific fuel consumption is decreased, it will result in an increase in torque. Therefore, when it is required to decrease both the specific fuel consumption and the torque simultaneously, and target values of the corresponding combustion parameters are calculated separately from each other, it may cause the target value of the specific fuel consumption to be achieved while an actual value of the torque deviates from the target value thereof or alternatively the target value of the torque to be achieved while an actual value of the specific fuel consumption deviates from the target value thereof.

In order to alleviate the above problem, the engine control system is, as described above, designed to extract the common factors Fp (i.e., common axes) of the plurality of performance parameters through, for example, the factor analysis and control the performance parameters simultaneously along the common axes. In the case of the specific fuel consumption and the torque that are two of the performance parameters, the engine control system extracts, as illustrated in FIG. 2(*b*), a common line L1 as the common factor Fp of the specific fuel consumption and the torque. The engine control system is also engineered to derive from the performance parameters the common factors Fp existing among the performance parameters in decorrelation to or independently of each other in order to control the performance parameters independently from each other. FIG. 2(*b*) illustrates the straight common line L1 extracted as the common factor Fp, but however, the common factor Fp may be expressed by a curved line.

Referring back to FIG. 1, the ECU 20 of the engine control system includes a target performance parameter calculator 30, a target common factor calculator 40, an actual common factor calculator 50, a combustion parameter calculator 70, and an actuator controller 90. The target performance parameter calculator 30 works as a target performance parameter determining circuit to determine target values of the performance parameters. The target common factor calculator 40 serves to extract the common factors Fp from the performance parameters. The combustion parameter calculator 70 works to determine target values of the combustion parameters. The actuator controller 90 works to control the operations of the actuators 90.

Specifically, the target performance parameter calculator 30 determines target performance parameters Pt through, for example, a target value-of-performance parameter map, as a function of an engine operating condition parameter (e.g., the speed of the engine 10 or the position of the accelerator pedal) and an environmental condition parameter (e.g., the temperature of engine coolant, the atmospheric pressure, or the temperature of ambient air).

The target common factor calculator 40 serves as a target common factor determining circuit to extract uncorrelated common factors from the target performance parameters Pt, as derived by the target performance parameter calculator 30 to determine target common factors Ft. Specifically, the target common factor calculator 40 is equipped with an arithmetic expression storage 41 in which the first correlation data is stored. The first correlation data includes the common factor arithmetic expression which defines correlations between the j performance parameters (p1, . . . pj) and the i common factors Fp (f1, . . . fi). The target common factor calculator 40 substitutes the target performance parameters Pt into the common factor arithmetic expression to derive the target common factors Ft.

FIG. 3 represents an example of the common factor arithmetic expression. The common factor arithmetic expression is defined by a determinant which is so designed that the product of a column vector A1 of variables representing the performance parameters and an i×j matrix A2 made up of entries $a_{11}$ to $a_{ij}$ is expressed as a column vector A3 of variables representing the common factors Fp. The common factor arithmetic expression is produced by, for example, the factor analysis.

Referring back to FIG. 1, the actual common factor calculator 50 samples actual values Pa of the performance parameters and extracts uncorrelated common factors from the actual values Pa as actual common factors Fa. Specifically, the actual common factor calculator 50 is equipped with an arithmetic expression storage 51 in which a common factor arithmetic expression (e.g., the determinant of FIG. 3) which defines correlations between the performance parameters and the common factors Fp is stored. The actual common factor calculator 50 substitutes the actual values Pa of the performance parameters into the common factor arithmetic expression to derive the actual common factors Fa.

The actual values Pa of the performance parameters may be derived by outputs of the performance sensors 12 or calculated using an engine model.

The target common factors Ft and the actual common factors Fa are inputted to a common factor deviation calculator 60. The common factor deviation calculator 60 calculates a difference between each of the target common factors Ft and a corresponding one of the actual common factors Fa as a common factor deviation Δf.

The combustion parameter calculator 70 calculates target combustion parameters Qt that are target values of the combustion parameters for bringing the actual common factors Fa into agreement with the target values Ft. Specifically, the combustion parameter calculator 70 serves as a target combustion parameter determining circuit and is equipped with an integrator 71 and a target combustion parameter calculator 72. The integrator 71 works to sum or totalize each of the common factor deviations if, as derived by the common factor deviation calculator 60, to produce an integral value x. The target combustion parameter calculator 72 calculates each of the target combustion parameters Qt as a function of a corresponding one of the integral values x, as inputted from the integrator 71.

More specifically, the target combustion parameter calculator 72 is equipped with an arithmetic expression storage 73 in which the second correlation data is stored. The second correlation data includes the combustion parameter arithmetic expression which defines correlations between changes in the i common factors Fp (f1, . . . fi) and changes in the k combustion parameters (q1, . . . qk). The target combustion parameter calculator 72 substitutes the integral values x into the combustion parameter arithmetic expression to derive target changes ΔQt as amounts by which the target values of the combustion parameters are to be changed and then corrects reference combustion parameters Qb using the target changes ΔQt to derive the target combustion parameters Qt, respectively. The reference combustion parameters Qb are pre-determined for each operating condition of the engine 10.

FIG. 4 represents an example of the combustion parameter arithmetic expression used in the target combustion parameter calculator 72. The combustion parameter arithmetic expression is defined by a determinant which is so designed that the product of an i-order column vector A4 of variables representing changes in common factors Fp and an k×i matrix A5 made up of entries $b_{11}$ to $b_{ki}$ is expressed as a k-order column vector A6 of variables representing changes in the combustion parameters. The combustion parameter arithmetic expression is produced by, for example, the multi-regression analysis.

The combustion parameter calculator 70, as described above, works to substitute the integral values x into the combustion parameter arithmetic expression to produce the target combustion parameters Qt, thereby minimizing steady-state deviations of actual values of the performance parameters from target values thereof. When the integral values x become zero, solutions of the combustion parameter arithmetic expression will be zero, so that the combustion states of the engine 10 are kept as they are. The target combustion parameters Qt, as determined by the combustion parameter calculator 70, are inputted to the combustion deviation calculator 80.

The combustion parameter deviation calculator 80 samples actual values Qa of the combustion parameters and the target combustion parameters Qt and calculates differences therebetween as combustion parameter deviations ΔQ. The actual values Qa of the combustion parameters may be derived by outputs of the combustion state sensors 13 or calculated using an engine model.

The actuator controller 90 is equipped with an integrator 91 and a command value calculator 92. The integrator 91 works to sum or totalize each of the combustion parameter deviations ΔQ, as derived by the combustion parameter deviation calculator 80, to produce an integral value y. The command value calculator 92 serves as a control command determining circuit to determine command values D representing the controlled parameters associated with the operations of the actuators 11, respectively, as a function of the integral values y, as inputted from the integrator 91. The command value calculator 92 outputs each of the command values D to a corresponding one of the actuators 11 in the form of a drive signal.

More specifically, the command value calculator 92 is equipped with an arithmetic expression storage 93 in which the third correlation data is stored. The third correlation data represents a controlled parameter arithmetic expression which defines correlations between changes in the k combustion parameters and changes in the h controlled parameters. The command value calculator 92 substitutes the integral values y into the controlled parameter arithmetic expression to derive deviations ΔD as amounts by which the controlled parameters are to be changed and then correct reference controlled parameters Db using the deviations ΔD to derive the command values D, respectively. The reference controlled parameters Db are pre-determined or calculated using a map for each operating condition of the engine 10.

FIG. 5 represents an example of the controlled parameter arithmetic expression used in the command value calculator 92. The controlled parameter arithmetic expression is defined by a determinant which is so designed that the product of a k-order column vector A7 of variables representing changes in combustion parameters and an h×k matrix A8 made up of entries $c_{11}$ to $c_{hk}$ is expressed as a h-order column vector A9 of variables representing changes in the controlled parameters. The controlled parameter arithmetic expression is produced by, for example, the multi-regression analysis.

The actuator controller 90, as described above, works to substitute the integral values y into the controlled parameter arithmetic expression to calculate the command values D, thereby minimizing steady-state deviations of actual values of the combustion parameters from target values thereof.

Figure 6:
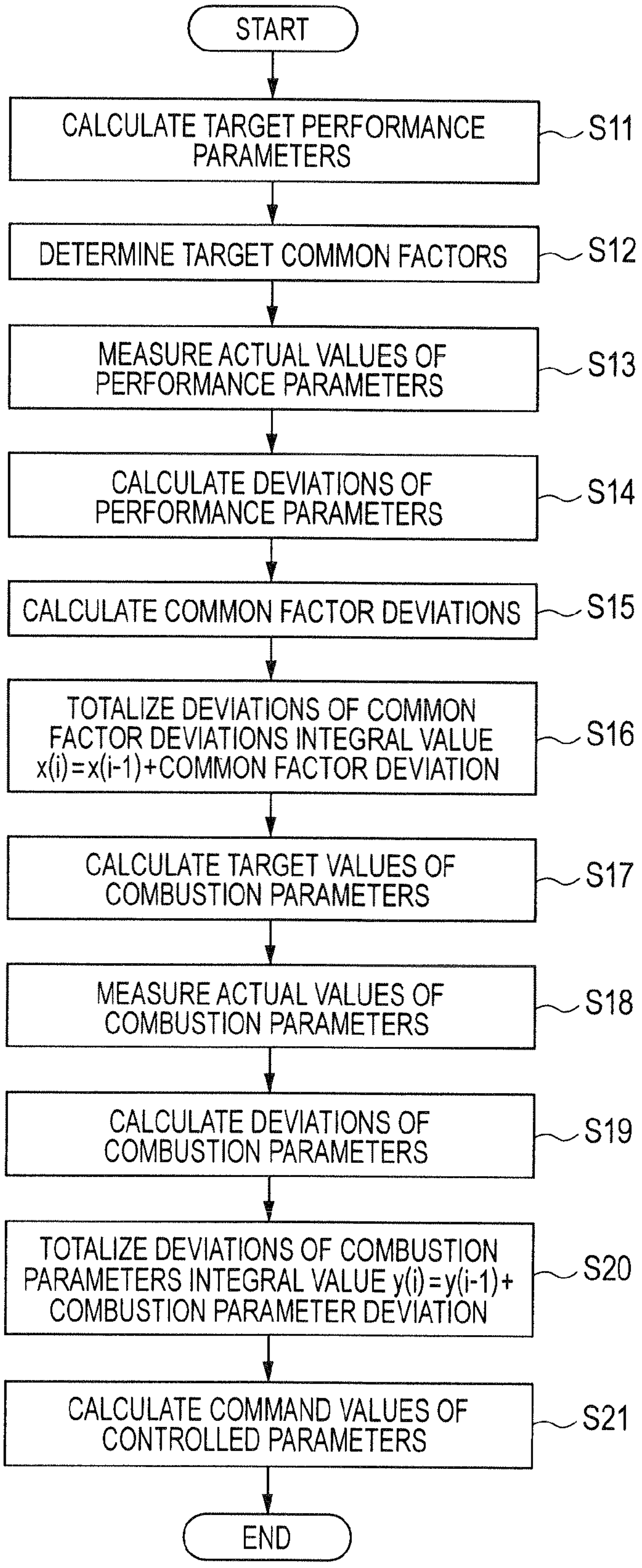
FIG. 6 is a flowchart of an actuator control program to be executed by the engine control system of FIG. 1.

Howe to calculate the command values D to be outputted to the actuators 11 to achieve desired values of the controlled parameters thereof will be described below with reference to a flowchart of an actuator control program, as illustrated in FIG. 6. This program is to be executed by the microcomputer of the ECU 20 at a regular interval (e.g., an operation cycle of the CPU or a cycle equivalent to a given crank angle of the engine 10).

After entering the program, the routine proceeds to step S11 wherein the target performance parameters Pt (e.g., a target amount of NOx, CO, HC, and/or PM (Particulate Matter), a target fuel consumption, a target engine torque, and a target level of combustion noise) are calculated based on operating conditions of the engine 10 such as the speed of the engine 10, the position of the accelerator pedal of the vehicle (i.e., a driver's effort on the accelerator pedal), and the temperature of engine coolant.

The routine proceeds to step S12 wherein the target common factors Ft that are target values of the common factors existing among the target performance parameters Pt are derived using the common factor arithmetic expression, as illustrated in FIG. 3. Specifically, the target performance parameters Pt are substituted into the elements of the column vector A1 of the common factor arithmetic expression of FIG. 3. Solutions of the elements of the column vector A3 are then determined as the target common factors Ft.

The routine proceeds to step S13 wherein the actual values Pa of the respective performance parameters are measured from outputs of the performance sensors 12. The ECU 20 may alternatively be designed to estimate or calculate the current performance parameters through arithmetic models and determine them as the actual values Pa without use of the performance sensors 12. Such estimation may be made only based on some of the performance parameters.

The routine proceeds to step S14 wherein the actual common factors Fa are determined based on the actual values Pa, as derive din step S13, using the common factor arithmetic expression. Specifically, the actual values Pa of the performance parameters are substituted into the elements of the column vector A1 of the common factor arithmetic expression of FIG. 3. Solutions of the elements of the column vector A3 are then determined as the actual common factors Fa.

The routine proceeds to step S15 wherein deviations of the actual common factors Fa, as derived in step S14, from the target common factors Ft, as derived in step S12, are determined as the common factor deviations 4*f.*

The routine proceeds to step S16 wherein an integral value x(i) of each of the common factor deviations, as derived in step S15, is calculated. More specifically, the sum of each of the integral values x(i−1), as derived one program execution cycle earlier, and a corresponding one of the common factor deviations Δf, as derived in this program execution cycle, is determined as the integral value x(i).

The routine proceeds to step S17 wherein the target combustion parameters Qt that are target values of the combustion parameters are calculated. Target combustion parameter changes ΔQt that are amounts by which the current target values of the combustion parameters are to be changed are calculated based on the integral values x(i) of the common factor deviations 4*f.* The reference combustion parameters Qb are corrected using the target combustion parameter changes ΔQt to derive the target combustion parameters Qt.

More specifically, the integral values x(i), as derived in step S16, are substituted into the elements of the column vector A4 of the combustion parameter arithmetic expression of FIG. 4. Solutions of the elements of the column vector A6 are determined as the target combustion parameter changes ΔQt. The reference combustion parameters Qb are calculated mathematically or determined by look-up using a map as a function of the operating condition of the engine 10 such as the speed of the engine 10. The target combustion parameter changes ΔQt are added to the reference combustion parameters Qb to derive the target combustion parameters Qt, respectively.

The routine proceeds to step S18 wherein the actual values Qa of the combustion parameters are determined. The actual values Qa may be derived using outputs of the combustion state sensors 13 or alternatively estimated using an arithmetic model. Such estimation may be made only on some of the combustion parameters.

The routine proceeds to step S19 wherein a deviation of each of the target combustion parameters Qt, as derived in step S17, from a corresponding one of the actual values Qa of the combustion parameters, as derived in step S18, (which will also be referred to as a combustion parameter deviation ΔQ below) is calculated.

The routine proceeds to step S20 wherein an integral value y(i) of each of the combustion parameter deviations ΔQ, as derived in step S19, is determined. Specifically, the sum of the integral value y(i−1), as derived one program execution cycle earlier, and the combustion parameter deviation ΔQ, as derived in this program execution cycle, is calculated as the integral value y(i).

The routine proceeds to step S21 wherein the command value D of each of the controlled parameters (i.e., the controlled variables for the actuators 11) is determined. Specifically, the deviation ΔD that is an amount by which each of the current command values are to be changed is calculated based on a corresponding one of the integral values y(i) of the combustion parameter deviations ΔQ. The reference controlled parameters Db are then corrected by the deviations ΔD to derive the command values D, respectively. More specifically, the integral values y(i) of the combustion parameter deviations ΔQ, as derived in step S20, are substituted into the elements of the column vector A7 of the controlled parameter arithmetic expression of FIG. 5, respectively. Solutions of the elements of the column vector A9 are then determined as the deviations ΔD. The reference controlled parameters Db are calculated mathematically or determined by look-up using a map as a function of the operating condition of the engine 10 such as the speed of the engine 10. The deviations ΔD are added to the reference controlled parameters Db to derive the command values D, respectively. The command values D are outputted in the form of drive signals to the actuators 11 to control the performance parameters in the coordinated way.

The engine control system of this embodiment offers the following advantages.

The engine control system has the first correlation data about the correlations between the different types of performance parameters and the common factors and uses the first correlation data to express the target values of the performance parameters by the plurality of uncorrelated common factors existing among the performance parameters. The engine control system also has the second correlation data about the correlations between the common factors and the different types of combustion parameters to determine the target values of the combustion parameters based on the target values of the common factors, as derived by converting the target values of the performance parameters, and calculates the command values (i.e., the target controlled parameters) used in driving the actuators 11 based on the target values of the combustion parameters.

Specifically, the engine control system has the common factor arithmetic expression (i.e., the first correlation data) and the combustion parameter arithmetic expression (i.e., the second correlation data). The common factor arithmetic expression is, as described above, designed to define the correlations between the plurality of performance parameters and the common factors. Similarly, the combustion parameter arithmetic expression is designed to define the correlations between the common factors and the plurality of combustion parameters. Therefore, unlike the prior art system which separately calculates target values of parameters corresponding to the performance parameters and the controlled parameters, the engine control system of this embodiment works to establish the harmonization of the performance parameters without any interference therebetween, thus ensuring the stability in controlling the engine 10, that is, improvement in bringing the performance parameters and the controlled parameters closer to the target values thereof. Additionally, the common factors which are extracted as the intermediate parameters from the performance parameters do not have any correlation. This enables the command values of the controlled parameters, as calculated using the common factors, to be used to control the plurality of performance parameters independently of each other simultaneously, thereby improving the controllability of the engine control system for the engine 10.

The engine control system also has the third correlation data about the correlations between the different types of combustion parameters and the different types of controlled parameters and uses the third correlation data to calculate the command values of the controlled parameters based on the target values of the combustion parameters. The third correlation data does not define one-to-one correspondences between the combustion parameters and the controlled parameters, but defines a plurality of correlations between each of the combustion parameters and the controlled parameters, thereby eliminating mutual interferences among the combustion parameters contributing the deterioration of control of the engine 10.

The engine control system of the second embodiment will be described below.

The engine control system of the first embodiment is, as described above, designed to substitute the common factors of the plurality of performance parameters into the combustion parameter arithmetic expression (i.e., the first correlation data) to derive the changes in plurality of combustion parameters and also substitute the deviations of the plurality of combustion parameters into the controlled parameter arithmetic expression (i.e., the third correlation data) to derive the changes in plurality of controlled parameters. The engine control system of the second embodiment is different from that of the first embodiment in such operations.

Figure 7:
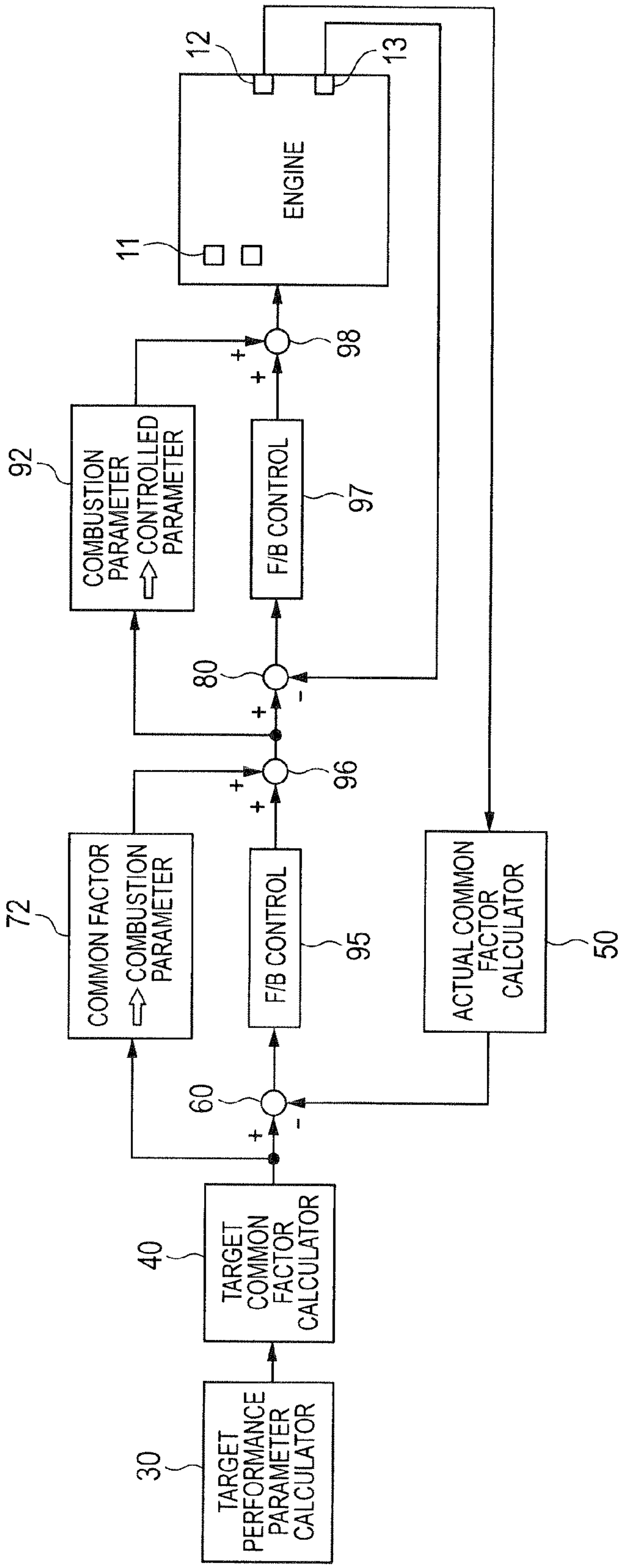
FIG. 7 is a block diagram which shows an engine control system according to the second embodiment.

Specifically, the engine control system of the second embodiment is, as illustrated in FIG. 7, engineered to substitute the target values of the common factors of the performance parameters into the combustion parameter arithmetic expression (i.e., the second correlation data) to derive the target values of the combustion parameters in the target combustion parameter calculator 72 and also substitute the target values of the combustion parameters into the controlled parameter arithmetic expression (i.e., the third correlation data) to derive the command values (i.e., target values) of the controlled parameters in the command value calculator 92.

The engine control system also includes feedback controllers 95 and 97 and correction circuits 96 and 98. The correction circuit 96 works to correct the targets of the performance parameters, as derived by the combustion parameter arithmetic expression, using correction values, as calculated by the feedback controller 95. Similarly, the correction circuit 98 works to correct the command values of the controlled parameters, as derived by the controlled parameter arithmetic expression, using correction values, as calculated by the feedback controller 97.

The engine control system of this embodiment serves to control the actual or calculated values of the combustion parameters and the performance parameters in the same coordinated feedback mode as in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The engine control system in each of the above embodiments controls the actual or calculated values of the combustion parameters and the performance parameters in the feedback mode, however, may alternatively be designed to control at least one of the former and the latter in the open-loop mode. For instance, the common factor deviation calculator 60, the feedback controller 95, and the correction circuit 96, as illustrated in FIG. 7, are omitted. The target values of the combustion parameters, as calculated through the target combustion parameter calculator 72, are outputted directly to the actuator controller 90 without being adjusted in the feedback mode. Alternatively, the combustion parameter deviation calculator 80, the feedback controller 97, and the correction circuit 98 may be omitted. The target values of the controlled parameters, as calculated by the command value calculator 92, are outputted directly to the actuators 11 without being adjusted in the feedback mode.

The engine control system uses the first correlation data (i.e., the common factor arithmetic expression) which defines the correlations between the different types of performance parameters and the common factors to calculate the target values of the common factors, uses the second correlation data (i.e., the controlled parameter arithmetic expression) which defines the correlations between the common factors and the different types of combustion parameters to calculate the target values of the combustion parameters, and also uses the third correlation data (i.e., the controlled parameter arithmetic expression) which defines the correlations between the different types of combustion parameters and the different types of controlled parameters to calculate the command values of the controlled parameters for controlling the operations of the actuators 11, etc., but may alternatively be designed to calculate the command values of the controlled parameters through an adaptability map without use of the third correlation data.

The ECU 20 may alternatively be engineered to store therein the first, second, and third correlation data in a form different from the parameter arithmetic expressions (i.e., the determinants). For instance, the first, second, and third correlation data may be expressed by maps. Specifically, the first correlation data is made by mapped constants representing a correlation of each of the common factors to the plurality of performance parameters. The second correlation data is made by mapped constants representing a correlation of each of the combustion parameters to the plurality of common factors. The third correlation data is made by mapped constants representing a correlation of each of the controlled parameters to the plurality of combustion parameters.

What is claimed is:

1. An engine control apparatus comprising:

a first storage which stores first correlation data representing correlations between a plurality of performance parameters associated with different types of performances of a combustion engine and uncorrelated common factors existing among the performance parameters;

a target common factor determining circuit which determines target values of the common factors based on target values of the performance parameters using the first correlation data stored in the first storage;

an actual common factor determiner which determines actual values of the common factors based on actual values of the performance parameters using the first correlation data stored in the first storage;

a common factor deviation determiner which determines a deviation between each of the target values of the common factors, as determined by the target common factor determining circuit, and a corresponding one of the actual values of the common factors, as determined by the actual common factor determiner;

a second storage which stores second correlation data representing correlations between the deviations of the common factors and a plurality of combustion parameters associated with combustion states of fuel in the combustion engine;

a target combustion parameter determining circuit which determines target values of the combustion parameters based on the deviations of the common factors, as derived by the common factor deviation determiner using the second correlation data stored in the second storage; and a control command determining circuit which determines command values as a function of the target values of the combustion parameters, as determined by the target combustion parameter determining circuit, the command values being provided to actuators which work to control the combustion states of the fuel in the combustion engine for achieving desired levels of the performances of the combustion engine, the command values representing controlled parameters associated with operations of the actuators.

2. An engine control apparatus as set forth in claim 1, further comprising a third storage which stores third correlation data which defines correlations between the combustion parameters and the controlled parameters, and wherein the control command determining circuit uses the third correlation data to determine the command values based on the target values of the combustion parameters, as determined by the target combustion parameter determining circuit.

3. An engine control apparatus comprising:

a first storage configured to store first correlation data representing correlations between a plurality of performance parameters associated with different types of performances of a combustion engine and uncorrelated common factors existing among the performance parameters;

a computer processor configured to:

determine target values of the common factors based on target values of the performance parameters using the first correlation data stored in the first storage;

determine actual values of the common factors based on actual values of the performance parameters using the first correlation data stored in the first storage;

determine a deviation between each of the determined target values of the common factors and a corresponding one of the determined actual values of the common factors;

store, in a second storage, second correlation data representing correlations between the deviations of the common factors and a plurality of combustion parameters associated with combustion states of fuel in the combustion engine;

determine target values of the combustion parameters based on the deviations of the common factors, as derived using the second correlation data stored in the second storage;

determine command values as a function of the determined target values of the combustion parameters; and provide the determined command values to actuators configured to control the combustion states of the fuel in the combustion engine for achieving desired levels of the performances of the combustion engine, the command values representing controlled parameters associated with operations of the actuators.

4. An engine control apparatus as set forth in claim 3, further comprising a third storage configured to store third correlation data which defines correlations between the combustion parameters and the controlled parameters, and wherein the third correlation data is used to determine the command values based on the target values of the combustion parameters.

* * * * *